US006277948B1

(12) United States Patent
Zahr

(10) Patent No.: US 6,277,948 B1
(45) Date of Patent: Aug. 21, 2001

(54) PROCESS AND PRODUCT FOR MAKING POLYAMIDES

(75) Inventor: George Elias Zahr, Glen Mills, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/469,811

(22) Filed: Dec. 22, 1999

Related U.S. Application Data

(63) Continuation-in-part of application No. 09/165,468, filed on Oct. 2, 1998, now abandoned.

(51) Int. Cl.[7] .......................... C08G 69/28; C08G 73/10; C08L 77/00
(52) U.S. Cl. .......................... 528/310; 528/313; 528/321; 528/323; 528/324; 528/332; 528/335; 528/337; 528/338; 528/339; 528/340; 528/349; 525/420; 525/432
(58) Field of Search ...................................... 528/310, 313, 528/323, 324, 338, 339, 335, 349, 332, 321, 337, 340; 525/420, 432; 428/364, 372, 395

(56) References Cited

U.S. PATENT DOCUMENTS

| 3,846,507 | 11/1974 | Thomm et al. ............... 260/857 TW |
| 3,962,159 | 6/1976 | Ray-Chaudhuri et al. ......... 260/17.4 |
| 4,578,454 | 3/1986 | Cantatore ............................. 528/327 |
| 4,894,422 | 1/1990 | Peiffer et al. ........................ 525/420 |
| 5,108,684 | * 4/1992 | Anton et al. ....................... 264/176.1 |
| 5,155,178 | 10/1992 | Windley .............................. 525/432 |
| 5,175,038 | 12/1992 | Tung et al. ............................. 428/92 |
| 5,223,196 | 6/1993 | Shridharani et al. ............... 260/17.4 |
| 5,422,420 | * 6/1995 | Shridharani ......................... 528/349 |
| 5,830,572 | * 11/1998 | Anton et al. ......................... 428/372 |

FOREIGN PATENT DOCUMENTS

| 0 222 501 | 1/1981 | (EP) | ............................. C08G/69/02 |
| 0 381 354 | 8/1990 | (EP) | ............................. C08F/299/02 |
| 0 505 031 | 9/1992 | (EP) | ............................. C08G/69/48 |
| 1 085 666 | 10/1967 | (GB) | ............................. C08G/19/00 |
| 1 090 893 | 11/1967 | (GB) | ............................. C08G/19/00 |

OTHER PUBLICATIONS

Suzuki et al., "Homogeneous Alkylation of Poly(M–Phenylene Isophthalamide)", *Polymer Engineering and Science*, 36(10), 1410–1413, May 1996.

* cited by examiner

Primary Examiner—P. Hampton-Hightower

(57) ABSTRACT

Disclosed in the present invention is a process for modifying a polyamide polymer comprising contacting a reactive modifier with diamine/diacid salt and/or an amino-acid of a hydrolyzed lactam or lactam to form a modified polyamide. A second embodiment of the present invention is a process for modifying a polyamide polymer comprising contacting a reactive modifier with diamine then contacting the resulting modified diamine with diacid and/or lactam to form a modified polyamide.

20 Claims, No Drawings

PROCESS AND PRODUCT FOR MAKING POLYAMIDES

This is a continuation-in-part of application Ser. No. 09/165,468 filed Oct. 2, 1998, now abandoned.

FIELD OF THE INVENTION

Disclosed in the present invention is a process for modifying a polyamide polymer comprising contacting a reactive modifier with diamine/diacid salt and/or an amino-acid of a hydrolyzed lactam to form a modified polyamide. A second embodiment of the present invention is a process for modifying a polyamide polymer comprising contacting a reactive modifier with diamine then contacting the resulting modified diamine with diacid and/or lactam to form a modified polyamide. Many of the products produced have improved characteristics such as stain resistance, enhanced cationic dyeing or deep dyeing.

TECHNICAL BACKGROUND

U.S. Pat. No. 5,175,038 relates to a highly bulked continuous filament yarns, comprised of filaments having a denier per filament of 10–25 and a trilobal filament cross section of modification ratio 1.4–4.0, including filament nylon yarns that have a yarn bulk level of at least 35, which can be ply-twisted together to high-twist levels and can be used in carpets at high-twist levels.

U.S. Pat. No. 5,155,178 relates to blends of nylon 6,6, nylon 6 or nylon, 6,6/6 copolymer which contain a randomly copolymerized cationic dye modifier, which are formed by melt blending the copolymer with a polyamide to form a block copolymer that is resistant to staining with acid dyes at ambient temperature and pH, but which can be dyed at pH 2–7 and 60–100° C.

U.S. Pat. No. 5,223,196 discloses terpolymers and interpolyamides which are either block or random. The patent involves making pigmented nylon fiber with decreased draw tension.

U.S. Pat. No. 3,962,159 discloses graft copolymers prepared by condensing a polyamideamine substrate with starch and a condensing reagent.

U.S. Pat. No. 3,846,507 discloses a fiber forming polyamide having basic dye receptivity and reduced acid dye receptivity, comprising a melt polymerized compound of the formula:

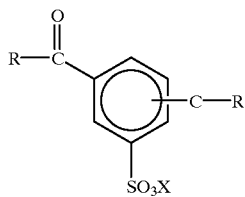

wherein R is OH, Cl, $OCH_3$ or $OC_2H_5$ and X is Li, Na, K or $NH_4$ and wherein the

groups are not ortho to each other.

SUMMARY OF THE INVENTION

The present invention relates to a product and a process for making polyamides and their copolymers, in which a portion of the amide nitrogens, terminal nitrogens and/or terminal acid groups have attached to them a modifier. An example is an embodiment disclosed herein that uses a sulfonate-containing group.

Disclosed in the present invention is a process for modifying a polyamide polymer comprising contacting a reactive modifier with diamine/diacid salt and/or an amino-acid of a hydrolyzed lactam to form a modified polyamide. As used herein, a reactive modifier is a vinyl molecule, a reactive cyclic molecule, or a molecule with a good leaving group which reacts with a primary amine group to produce a secondary amine, which subsequently reacts with an acid group to form an amide with an N-pendant group, or becomes a substituted terminal group on the polymer chain. A second embodiment of the present invention is a process for modifying a polyamide polymer comprising contacting a reactive modifier with diamine then contacting the resulting diamine with diacid and/or lactam to form a modified polyamide.

An example of a lactam that may be hydrolyzed in the present invention is caprolactam, commonly used in the manufacture of nylon 6.

Also disclosed is a polyamide having a modifier group pendant from the amide nitrogen.

Further disclosed is a modified polyamide fiber possessing stain resistant qualities comprising a nylon composition having pendant ethyl sulfonate groups on about 0.1–2 percent of the amide nitrogens.

DETAILED DESCRIPTION OF THE INVENTION

The production of aliphatic and aromatic polyamides, particularly nylons including nylon 6, nylon 6,6 and their copolymers, is well known. These polymers contain amine, acid and amide groups, which can be substituted with moieties which can modify the properties, such as dyeability, tensile strength, catalytic activity, and the like. See generally U.S. Pat. Nos. 5,422,420, 5,223,196, 3,389,549, which are incorporated herein by reference. See also Kirk Othmer Encyclopedia of Chemical Technology, 4th ed., 1996, Vol. 19, pp. 454–518, and Ullmann's Encyclopedia of Industrial Chemistry, 1992, Vol. A21, pp. 190–191.

The present invention allows the production of modified aliphatic and aromatic polyamides and other amide-, amine- or carboxylic acid-containing polymers and copolymers, particularly nylons and aramids, including but not limited to nylon 6, nylon 6,6, Kevlar® and Nomex®, in a new way that is currently not available. For example, sulfonated and/or acid-dye resistant modifiers may be used. In general, the present improvement can be used with any process useful for making polyamides and other polymers, as described in the background above, including batch and continuous polymerization processes. No equipment modification is generally necessary, as additional ports on evaporators, transfer lines and autoclaves are generally available for addition of process and product property control additives. Additives include, but are not limited to, antifoam agents, antioxidants, delustrants, antistatic agents, branching agents and the like.

The modifying process comprises contacting a primary amine-terminal group on a monomer or polymer/oligomer molecule with a reactive modifier to form a secondary modified amine, then contacting the modified amine with an acid terminal group on a monomer or polymer/oligomer molecule.

As used herein, a reactive modifier is a vinyl molecule, a reactive cyclic molecule, or a molecule with a good leaving group which reacts with the primary amine group to produce a secondary amine, which subsequently reacts with an acid group to form an amide with an N-pendant group, or becomes a substituted terminal group on the polymer chain.

Typically, in a nylon 6,6 process, hexamethylenediammonium adipate salt (approximately 52% by weight in water) is added to an evaporator. Various additives may be added at this stage. Under inert atmosphere, this reaction mixture is then heated to a boil (about 160° C.) under slight pressure to remove the excess water and thus increase its concentration. A slight pressure is desirable to minimize the loss of volatile materials like hexamethylenediamine. Upon reaching the desired concentration, typically in the range of 70–90% by weight, the reaction mixture is transferred through a transfer line to an autoclave, which is a high pressure reactor. The reaction mixture is maintained under an oxygen-free atmosphere to avoid undesirable side reactions such as oxidative degradation. While in the autoclave, the reaction mixture is heated to a temperature between about 175° C. and about 200° C., while increasing the pressure to about 300 psia to again minimize loss of volatile organic compounds. Oligomers are formed during this stage, which generally takes about an hour. The temperature is then increased to between about 250° C. and 310° C., and the pressure is released at a slow rate to bleed off steam and thus drive the condensation reaction towards polymerization. While maintaining approximately the same temperature, the reaction mixture is held at a low constant pressure for sufficient time to obtain the desired extent of reaction. The polyamide is then extruded from the reaction vessel and conveniently chopped and dried to produce flake. The relative viscosity (RV) from the autoclave of both nylon 6,6 homopolymer and the inventive material can be in the range of 15 to 80, but is generally between 20 and 55.

The polyamide flake thus produced can be spun at the RV at which it is produced, or it can be further polymerized to a higher RV by conventional solid phase polymerization processes. Alternatively, the RV can be increased by other means such as by venting off water as the polymer is melted in the extruder prior to spinning.

Additives may be added to the reaction mixture through inlet ports in the evaporator, the transfer line, or the autoclave. Modifiers, such as 5-sulfoisophthalic acid, may be added to the hexamethylene diamine to form a salt which can be added either to the evaporator or the autoclave. This provides the uniformity needed throughout the copolymer feed to produce uniform product. Such modification can be used, for example, to modify dyeability.

One embodiment of this invention is the addition of amine-reactive modifiers, including vinyl and other reactive modifiers, such as vinyl sulfonate sodium salt (VSS), 1,4-butane sultone, styrene sulfonate sodium salt, isethionic acid sodium salt and chloroethane sulfonate sodium salt, directly to the polyamide-precursor salt in the autoclave, the evaporator, or the transfer line between the two vessels. The structure of these modifiers is shown below.

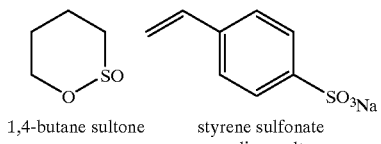

1,4-butane sultone    styrene sulfonate
                      sodium salt

-continued

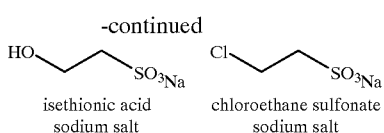

isethionic acid       chloroethane sulfonate
sodium salt           sodium salt

Sodium ions can replaced by other positive ions in these modifiers.

Vinyl pyridine, styrene, methyl vinyl ketone, 3,3,4,4,5,5,6,6,6-nanofluoro-1-hexene and vinyl phosphinic acid can also be used as modifiers in this way.

This allows for an in situ terminal amine modification, which in turn allows for the production of modified polyamides, for example. These modifiers are generally added at concentrations of about 0.1% to about 25% by weight, preferably between about 0.5% and 3% by weight, essentially all of which is incorporated into the polymeric product. The only essential characteristic of such a modifier is that it reacts with the amine group(s) to form a secondary amine, before the amine group reacts with an acid group to form an amide. Additionally, these materials are generally less expensive than other commonly used modifiers, such as 5-sulfoisophthalic acid or 1,4-bis (3-aminopropyl) piperazine.

A second embodiment is much like the first, except that instead of the modifier being added "neat", it is premixed with an amount of hexamethylenediamine adipate, for example, and then added to the reaction mixture at any of the points as detailed above. The final product is the same, but this embodiment allows for improved mixing.

A third embodiment comprises contacting the modifier with hexamethylene diamine, which is then added to the acid (e.g., adipic acid) to form the salt.

The chemistry of this process for the in situ terminal amine modification is shown below and compared with that for modification with functionalized diamine and/or diacid modifiers during polymerization.

The key to this approach is a Michael addition of the amine end of the diamine (hexamethylenediamine) to the double bond of the vinyl monomer

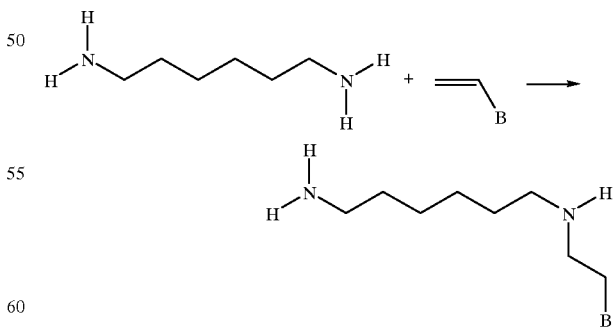

or a Michael addition of a terminal amine group on a polymer or oligomer chain

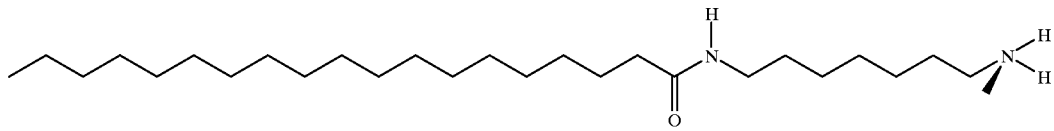

to a double bond of a vinyl monomer.
wherein B is an organic group consisting of C, H, S, N, P and salts thereof. In the structures above, the /\/\/\/\ section is an aliphatic or aromatic moities represent the rest of the polymer chain containing one or more of the following elements—C, H, N, O, S.

Selected modifiers for use in the polymerization herein include but not limited to the following:

| | |
|---|---|
| 1-hexene, | |
| 3,3,4,4,5,5,6,6,6-nanofluoro-1-hexene, | sytrene, |
| methyl acrylate, | methyl methacrylate, |
| styrene sulfonate sodium salt, | vinyl acetate, |
| 2-pentenenitrile, | acrylamide, |
| butadiene sulfone, | Isethionic acid sodium salt, |
| 2-methyl-2-propene-1-sulfonic acid Na, | methyl vinyl ketone, |
| N-vinyl-2-pyrrolidinone, | isophorone, |
| vinylphosphinic acid, | vinyl sulfonate sodium salt, |
| 2-acrylamido-2-methylpropanesulfonic acid Na, | |
| 4-vinylpyridine | 1,3-propane sultone |
| 1,4-butane sultone, | |

Shown below is the present polymerization starting with a modified secondary amine that results in a polyamide with a modifier as part of the N-pendant group. In the drawing below, and for simplification, we describe the chemistry on the terminal amine of a hexamethylenediamine monomer reacting with an adipic acid monomer. The same type of chemistry occures on terminal amine groups on a diamine, polymer or an oligomer chain reacting with a terminal acid group on a diacid or a polymer or an oligomer chain. The present polymerization can be compared to modification with diacid or diamine comonomers during polymerization wherein the modifiers (R and R') become part of the polymer "backbone" and are not part of the N-pendant group.

Polymerization

In this drawing below, and for simplification, we describe the chemistry on the terminal amine of a hexamethylenediamine monomer reacting with an adipic acid monomer. The same type of chemistry occurs on terminal amine groups on a diamine, polymer or an oligomer chain followed by reacting with a terminal acid group on a diacid, a polymer or an oligomer chain.

The modified secondary amine, in turn, reacts with the acid to produce the modified amide with an N- pendant group in the backbone of a nylon polymer chain.

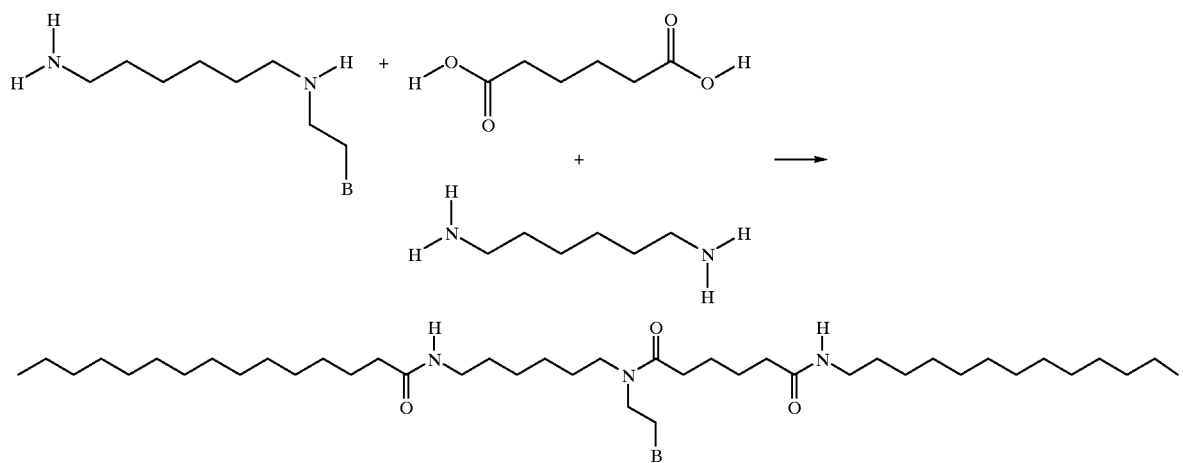

The above process can be compared to modification during polymerization.

Modification by Co-monomers During Polymerization

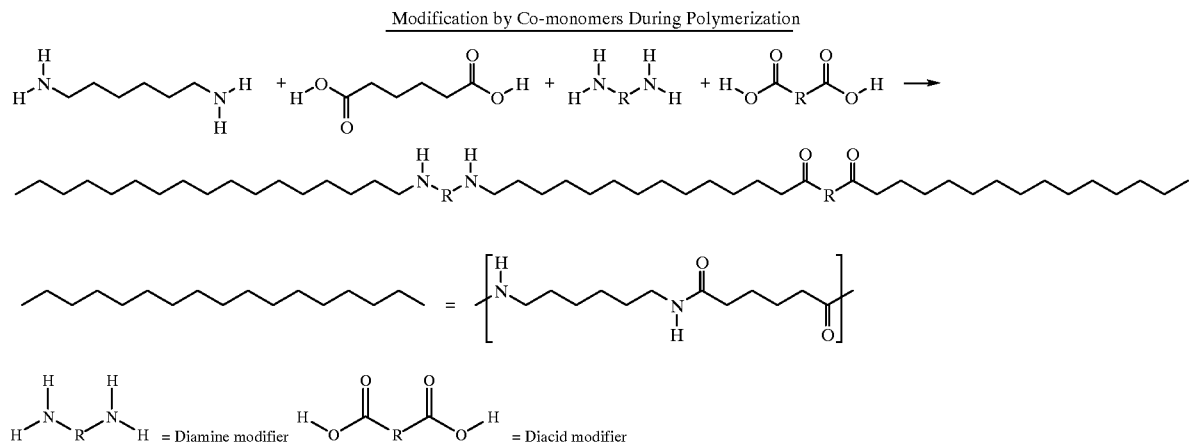

In the structures above, the /\/\/\/\ sections is an aliphatic or aromatic moities represent the rest of the polymer chain containing one or more of the following elements, C, H, N, O and S.

The polyamides of the invention can be spun into fibers using conventional melt-spinning techniques. For instance, the polyamide(s) in flake form is (are) remelted, preferably using a screw melter type extruder. As known to those skilled in the art, other materials including other polyamides and/or pigments, can be added before or during the remelt process. It is not necessary, of course, to use this remelt step if a continuous polymerizer is employed to prepare the polyamides.

Following the formation of the homogeneous melt or melt-blend, the melt is typically pumped through a transfer line to a metering pump. The metering pump controls the volume of polymer delivered to an extrusion pack consisting of filtration media and spinneret plate. After filtration, the polymer melt, typically at a temperature about 20° C. to about 60° C. higher than the polymer melting point, is extruded through spinneret orifices into a quench chimney to form filaments that are cooled to a non-tacky state by a cross-flow of gaseous media, usually humidified chilled air of at least 50% relative humidity at 10° to 30° C. The filaments may alternatively be cooled by a radial quench unit.

The cooled filaments are converged, typically at the bottom of a quench drawer. A spin finish is applied to the converged filament bundle by using roll applicators or metered finish tip applicators. The filaments are pulled through the quench zone and over the finish applicators by a feeder roll.

Conventional processes and equipment may be used for drawing these fibers. These include both cold drawing at room temperature, hot drawing at 60°–180° C., and both single-stage and multi-stage drawing processes. Some of these techniques are described in U.S. Pat. Nos. 4,612,150 (DeHowitt) and 3,311,691 (Good). Also, these modified polyamides can be used in a high speed spinning process without any mechanical draw to obtain high quality feed yarns for use in draw texturing and for warp-drawing.

Fibers of this invention can be engineered into essentially any form in which fibers are conventionally made, including, without limitation, filament yarns, staple fibers, monofilament, and strands. The fibers can be textured, bulked or crimped using well-known methods and can be colored using pigments or dyes. End-use applications for the fibers extend to all areas where polyamide fibers have been utilized, including, by way of example, apparel, carpets, rugs, upholstery, and industrial applications (tires, hoses, ropes, paper-making felts, etc.).

It will be appreciated that the inventive materials can also be used in films, engineering polymers and any end-use that would benefit from the use of these modified polymeric materials (e.g., stain resistant fibers, deep-dyeing fibers, etc.).

Analytical Test Methods

Relative viscosity (RV) was determined on solutions containing 8.40% by weight of the nylon polymers in 90.0% formic acid, based on ASTM Standard Test Method D789. Amine and carboxyl end groups were determined by methods similar to those described in the Encyclopedia of Industrial Chemical Analysis Vol. 17 John Wiley & Sons, New York 1973, p 293–294, which are herein incorporated by reference.

Nuclear Magnetic Resonance (NMR) measurements were performed on 300 Mhz, 400 Mhz and 500 Mhz machines. A series of model compounds including taurine, sodium isethionate, N-(2-ethyl sulfonate sodium salt) hexylamine, mono and di N-(2-ethyl sulfonate sodium salt) hexamethylenediamine, diester of sodium isethionate and adipic acid, hexylhexanoamide, and a mixture of hexylhexanoamide and N-(2-ethyl sulfonate sodium salt) hexylhexanoamide. The hydrogen and Carbon (13) spectra of these compounds was assigned using 2-D COSY, TOCSY, hmqc and hmqc-TOCSY NMR experiments that corolate neighboring atoms. This established the chemical shift of various hydrogen atoms. The spectra of modified nylon was confirmed based on these results. See "Two Dimensional NMR Spectroscopy—Applications for Chemists and Biochemists", 2nd edition, edited by W. R. Croasmun and R. M. K. Carlson, 1994 VCH Publishers, New York.

Matrix Assisted Laser Desorption/Ionization (MALDI) mass spectroscopy measures the molecular weight of polymers and especially oligomers. These measurements are precise to less than one atomic weight unit and are used to determine the number of repeat units and ends. N-substituted nylon can be detected by measuring the polymer molecular weight. In addition to nylon standard peaks, additional peaks represent the additional weight of N-substituents on the amide are present. See McEwen, C. N.; Jackson, C.; Larsen, B. S. "Instrumental Effects in the Analysis of Polymers of Wide Polydispersity by MALDI Mass Spectrometry" Int. J. Mass Spectrom. and Ion Processes, 160, (1997), 387–394; Bahr, U.; Deppe, A.; Karas, M.; Hillenkamp, F.; and Giessman, U., Anal. Chem., 64, (1992), 908.

Stain Test Methods

A solution of staining agent is prepared by dissolving 45 grams of cherry-flavored sugar-sweetened "Kool-Aid" pre-mix powder in 500 cc of water, and it is allowed to reach room temperature, i.e., 75° F. (±5°) or 24° C. (±3°), before using. This solution was used to test stain resistance of either nylon polymer granules (pass through 20 mesh screen), fibers, knitted textile tubes or carpet.

The test on nylon polymer granules and fibers was performed by placing 1 gm of granules or fiber in 20 ml of the "Kool-Aid" staining solution for 60 min. The nylon granules or fiber is separated from the staining solution by vacuum filtration followed by three rinsings with deionized water. The rating system is similar to that of the knitted textile tubes and carpet rating.

The following test procedure according to U.S. Pat. No. 5,115,175, columns 4 and 5, was used to determine the stain-resistance performance of textile and carpet samples.

A specimen, approximately 1.5 in.×3 in (3.8×7.6 cm) for carpet samples and approximately 2 in×4 in (5.1×10.2 cm) for flattened knitted textile tubes, is cut from each sample and placed on a flat, non-absorbant surface and 20 cc (10 cc for textile samples) of the staining agent is poured onto each specimen through a cylinder to form a 1 to 2 inch (2.5 to 5.1 cm) circular stain. The cylinder is removed and the solution is worked into the fabric or carpet to achieve uniform staining. The samples are then lagged in the laboratory for twenty-four hours and then rinsed thoroughly with cool tap water and squeezed dry, using an extractor to remove excess solution.

The stain resistance of the specimen is determined visually according to the amount of color left on the stained area of the fabric. This is referred to as the stain rating, and is herein determined for samples that are dyed to a very light beige color according to the Stain Rating Scale (a copy of which is currently used by and available from the Flooring Systems Division of E.I. du Pont de Nemours and Company, Wilmington, Del. 19898). These colors can be categorized according to the following standards:

5=no staining
    4=slight staining
    3=moderate staining
    2=considerable staining
    1=heavy staining.

Carpets and fabrics that were dyed to deeper color shades were rated similarly on a scale of 1 to 5.

A stain-rating of 5 is excellent, showing good stain-resistance, whereas 1 is a poor rating, showing persistence of heavy staining. For a substrate to be considered to have adequate stain-resistance, it should have a rating of at least 4 on the above-described Stain Rating Scale.

EXAMPLES

This set of examples demonstrate that as the amount of vinyl sulfonate sodium salt (VSS) is increased the stain resistance increases and RV decreases. It is desirable to have the maximum stain rating and the maximum RV, thus limiting the practical range of VSS.

Comparative Example A and Examples 1–3

Into a small autoclave set at 120° C. was added 59.07 gms of 51.5% aqueous solution of hexamethylenediamine/adipic acid salt (nylon salt), and an amount of 25.6% of aqueous solution of vinyl sulfonate sodium salt (VSS). The autoclave was equipped with a pressure relief valve set at 250 psi. The temperature of the autoclave was increased from 120° C. to 240° C. over a period of 100 min. Over the following period of 60 min., the autoclave temperature was increased from 240° C. to 275° C. and the pressure was reduced to atmospheric pressure. The temperature was maintained at 275° C. for an additional period of 60 min. The nylon polymer was removed from the autoclave and analyzed. The presence of ethyl sulfonate on the nitrogen amide was confirmed by NMR and MALDI. The polymer, amine and acid end equivalent per million grams of polymer where measured. Granules (<20 mesh) are used to measure stain rating.

| Example | VSS (gm) | Weight % Of VSS§ | RV | Amine* | Acid* | Stain Rating |
|---------|----------|------------------|------|--------|-------|--------------|
| Comp. A | Control  | 0%               | 41.5 | 54.1   | 95.0  | 1            |
| 1       | 0.73     | 0.61%            | 31.3 | 59.8   | 103.8 | 3            |
| 2       | 1.46     | 1.23%            | 25.1 | 77.7   | 117.5 | 5            |
| 3       | 2.93     | 2.47%            | 18.2 | 93.9   | 136.3 | >5           |

§Weight % of pure dry VSS to pure dry nylon salt
*units are in equivalents/million grams of polymer Examples 4 and 5

Into a medium size autoclave at room temperature, was added 68 pounds of 51.5% aqueous solution of hexamethylenediamine/adipic acid salt (nylon salt), 0.35 gms of Carbowax®, Dow Chemical, Midland, Mich., anti foaming agent, 55 gms of hexamethylenediamine, and an amount of of 25.6% aqueous vinylsulfonate sodium salt. The autoclave was closed with a vent pressure at 250 psi and was heated to 240° C. over a period of 240 min. Over the following period of 90 min., the autoclave temperature was increased from 240° C. to 275° C. and the pressure was reduced to atmospheric pressure. The temperature was maintained at 275° C. for an additional period of 60 min. The nylon polymer was removed from the autoclave and analyzed.

| Example | Salt (lb.) | VSS (lb.) | Weight % Of VSS§ | RV | Amine* | Acid* | Stain Rating |
|---------|------------|-----------|------------------|------|--------|-------|--------------|
| 4       | 68 lb      | 1.90      | 1.39%            | 31.0 | 85.4   | 82.3  | 4            |
| 5       | 68 lb      | 3.79      | 2.77%            | 37.0 | 76.3   | 77.2  | 5            |

§ Weight % of pure dry VSS to pure dry nylon salt

Example 6

Into a small autoclave set at 120° C. was added 59.07 gms of 51.5% aqueous solution of hexamethylenediamine/adipic acid salt (nylon salt) and 13.7 gms of 30.5% aqueous vinylsulfonate sodium salt. The autoclave was equipped with a pressure relief valve set at 250 psi. The temperature of the autoclave was increased from 120° C. to 240° C. over a period of 100 min. Over the following period of 60 min., the autoclave temperature was increased from 240° C. to 275° C. and the pressure was reduced to atmospheric pressure. The temperature was maintained at 275° C. for an additional period of 60 min. The nylon polymer was removed from the autoclave and analyzed. The presence of ethyl sulfonate on the nitrogen amide was confirmed by NMR. The polymer produced has a 8.9 RV. The structure of the N-ethylsulfonate on a portion of the amide linkages in the nylon backbone was confirmed by NMR (3.8–4.0 ppm).

Example 7

Into a small autoclave set at 120° C. was added 59.07 gms of 51.5% aqueous solution of hexamethylenediamine/adipic acid salt (nylon salt) and 1.82 gms of 30.5% aqueous vinylsulfonate sodium salt. The autoclave was equipped with a pressure relief valve set at 250 psi. The temperature of the autoclave was increased from 120° C. to 240° C. over a period of 100 min. Over the following period of 60 min., the autoclave temperature was increased from 240° C. to 275° C. and the pressure was reduced to atmospheric pressure. The temperature was maintained at 275° C. for an additional period of 60 min. The nylon polymer was removed from the autoclave and analyzed. The presence of ethyl sulfonate on the nitrogen amide was confirmed by NMR. The polymer produced has a 16.8 RV, 96.8 amine end equivalent per million grams of polymer and 157.5 acid end equivalent per million grams of polymer. This sample was tested by MALDI to confirm the presence of sodium ethylsulfonate (molecular weight=131). An additional set of MALDI peaks shifted by 131 appeared in the spectra. When the sodium MALDI counter ion was replaced by potassium a set of peaks representing a shift of 147 appeared (potassium ethylsulfonate molecular weight=147).

Example 8

Into a small autoclave set at 120° C. was added 59.07 gms of 51.5% aqueous solution of hexamethylenediamine/adipic acid salt (nylon salt) and 0.60 gms of styrenesulfonate sodium salt. The autoclave was equipped with a pressure relief valve set at 250 psi. The temperature of the autoclave was increased from 120° C. to 240° C. over a period of 100 min. Over the following period of 60 min., the autoclave temperature was increased from 240° C. to 275° C. and the pressure was reduced to atmospheric pressure. The temperature was maintained at 275° C. for an additional period of 60 min. The nylon polymer was removed from the autoclave and analyzed. The presence of ethyl sulfonate on the nitrogen amide was confirmed by NMR. The polymer produced has a 42.9 RV, 48.6 amine end equivalent per million grams of polymer and 95.4 acid end equivalent per million grams of polymer. Granules (<20 mesh) had a stain rating of 5.

Example 9

Into a small autoclave set at 120° C. was added 59.07 gms of 51.5% aqueous solution of hexamethylenediamine/adipic acid salt (nylon salt) and 0.42 gms of sodium isethionate. The autoclave was equipped with a pressure relief valve set at 250 psi. The temperature of the autoclave was increased from 120° C. to 240° C. over a period of 100 min. Over the following period of 60 min., the autoclave temperature was increased from 240° C. to 275° C. and the pressure was reduced to atmospheric pressure. The temperature was maintained at 275° C. for an additional period of 40 min. The pressure of the autoclave was reduced to 250 mm Hg over a period of 10 min. and then maintained at this reduced pressure for an additional 40 min. The vacuum and heat were turned off and the nylon polymer was removed from the autoclave and analyzed. The polymer produced has a 44.4 RV, 48.1 amine end equivalent per million grams of polymer and 81.7 acid end equivalent per million grams of polymer. This polymer was spun into fiber and the fiber was stain tested and had a stain rating of 4.

Comparative Example A and Examples 10 and 11

Into a small autoclave set at 120° C. was added 59.07 gms of 51.5% aqueous solution of hexamethylenediamine/adipic acid salt (nylon salt) and an amount of vinylphosphinic acid (VPA). The autoclave was equipped with a pressure relief valve set at 250 psi. The temperature of the autoclave was increased from 120° C. to 240° C. over a period of 100 min. Over the following period of 60 min., the autoclave temperature was increased from 240° C. to 275° C. and the pressure was reduced to atmospheric pressure. The temperature was maintained at 275° C. for an additional period of 60 min. The nylon polymer was removed from the autoclave and analyzed. Vinylphosphonic acid acts as a nylon catalyst build in the backbone and increases the nylon RV.

| Example | VPA (gm) | Weight % Of VPA§ | RV | Amine* | Acid* |
|---|---|---|---|---|---|
| Comp. B | Control | 0% | 34.0 | 58.9 | 97.1 |
| 10 | 0.005 | 0.016% | 40.0 | 52.5 | 89.7 |
| 11 | 0.015 | 0.049% | 45.7 | 43.5 | 86.6 |

§Weight % of pure dry VPA to pure dry nylon salt
*units are in equivalents/million grams of polymer

Example 12

Into a small autoclave set at 120° C. was added 59.07 gms of 51.5% aqueous solution of hexamethylenediamine/adipic acid salt (nylon salt) and 0.23 gms of 2-methyl-2-propene-1-sulfonic acid sodium salt. The autoclave was equipped with a pressure relief valve set at 250 psi. The temperature of the autoclave was increased from 120° C. to 240° C. over a period of 100 min. Over the following period of 60 min., the autoclave temperature was increased from 240° C. to 275° C. and the pressure was reduced to atmospheric pressure. The temperature was maintained at 275° C. for an additional period of 60 min. The nylon polymer was removed from the autoclave and analyzed. The polymer produced has a 56.8 RV, 18.2 amine end equivalent per million grams of polymer and 88.5 acid end equivalent per million grams of polymer.

Example 13

Into a small autoclave set at 120° C. was added 59.07 gms of 51.5% aqueous solution of hexamethylenediamine/adipic acid salt (nylon salt) and 0.29 gms of methyl methacrylate. The autoclave was equipped with a pressure relief valve set at 250 psi. The temperature of the autoclave was increased from 120° C. to 240° C. over a period of 100 min. Over the following period of 60 min., the autoclave temperature was increased from 240° C. to 275° C. and the pressure was reduced to atmospheric pressure. The temperature was maintained at 275° C. for an additional period of 60 min. The nylon polymer was removed from the autoclave and analyzed. The polymer produced has a 43.0 RV, 40.9 amine end equivalent per million grams of polymer and 96.0 acid end equivalent per million grams of polymer.

Example 14

Into a small autoclave set at 120° C. was added 59.07 gms of 51.5% aqueous solution of hexamethylenediamine/adipic acid salt (nylon salt), 0.15 gms of hexamethylenediamine and 0.10 gms of 4-vinylpyridine. The autoclave was equipped with a pressure relief valve set at 250 psi. The temperature of the autoclave was increased from 120° C. to 240° C. over a period of 100 min. Over the following period of 60 min., the autoclave temperature was increased from 240° C. to 275° C. and the pressure was reduced to atmospheric pressure. The temperature was maintained at 275° C. for an additional period of 60 min. The nylon polymer was removed from the autoclave and analysed. The polymer produced has a 47.4 RV, 69.7 amine end equivalent per million grams of polymer and 95.6 acid end equivalent per million.

What is claimed is:

1. A process comprising contacting an epoxy containing reactive modifier with an amine containing moiety, said amine containing moiety selected from the group consisting of diamine, diamine/diacid salt, lactam and amino-acid of a hydrolyzed lactam, to form a polyamide, and said epoxy-containing reactive modifier selected from the group consisting of a vinyl molecule, a reactive cyclic molecule, or a molecule with a good leaving group which reacts with the amine containing moiety to form a secondary amine before the amine containing moiety reacts with an acid group to form an amide.

2. The process of claim 1 wherein the reactive modifier is selected from the group consisting of

| | |
|---|---|
| 1-hexene, | |
| 3,3,4,4,5,5,6,6,6-nanofluoro-1-hexene | styrene |
| methyl acrylate, | methyl methacrylate |
| styrene sulfonate sodium salt, | vinyl acetate, |
| 2-pentenenitrile, | acrylamide, |
| butadiene sulfone, | isethionic acid sodium salt, |
| 1,4-butane sultone | 1,3-propane sultone |
| 2-methyl-2-propene-1-sulfonic acid Na, | methyl vinyl ketone, |
| N-vinyl-2-pyrrolidinone, | isophorone, |
| vinylphosphinic acid, | vinyl sulfonate sodium salt, |
| 4-vinylpyridine | |
| 2-acrylamido-2-methylpropanesulfonic acid Na, | . |

3. The process claim 1 wherein the reactive modifier is a vinyl sulfonate salt.

4. The process of claim 1 or 2 wherein the reactive modifier is added at concentrations of 0.1% to 5% by weight.

5. The process of claim 1 or 2 wherein the reactive modifier is added at concentrations of about 0.5% to 3% by weight.

6. The process of claim 1 wherein the lactam is caprolactam.

7. The process of claim 1 wherein the polyamide polymer to be modified is selected from the group consisting of aliphatic polyamides, aromatic polyamides and mixtures thereof.

8. The process of claim 7 wherein the aliphatic polyamide is nylon 6,6.

9. The process of claim 7 wherein the aliphatic polyamide is nylon 6.

10. The process of claim 8 or 9 wherein the resulting product is a nylon composition having pendant ethyl sulfonate groups on about 0.1–2 percent of the amide nitrogens.

11. The process of claim 1 wherein the polymer to be modified is an aromatic polyamide.

12. A polyamide having modifier group(s) pendant from the amide nitrogen.

13. The composition of claim 12 wherein the modifier group is selected from the group consisting of

| | |
|---|---|
| hexane | |
| 3,3,4,4,5,5,6,6,6-nanofluoro-hexane, | 2-phenyl-ethane, |
| methylpropionate, | 2-methyl-methpropionate |
| 2-(4-sulfo-phenyl)-ethane sodium salt, | ethyl acetate, |
| 2-cyano-pentane, | propionamide, |
| butene | |
| 4-butane sulfonate | 3-propane sulfonate |
| 2-methyl-2-propane-1-sulfonate Na, | methyl ethyl ketone, |
| ethyl-(N-2-pyrrolidinone), | isophorone aduct, |
| ethylphosphinic acid, | ethyl sulfonate sodium salt, |
| ethyl-(4-pyridine) | |
| propionamido-2-methylpropanesulfonate Na, | . |

14. The composition claim 12 wherein the modifier is an ethyl sulfonate salt.

15. The composition of claim 12 or claim 13 wherein the modifier is present as 0.1% to 5% by weight.

16. The composition of claim 15 wherein the modifier is present at concentrations of about 0.5% to 3% by weight.

17. The composition of claim 12 wherein the polyamide polymer modified is selected from the group consisting of aliphatic polyamides and aromatic polyamides.

18. The composition of claim 17 wherein the aliphatic polyamide is nylon 6,6.

19. The composition of claim 17 wherein the aliphatic polyamide is nylon 6.

20. The composition of claim 18 or 19 wherein groups pendant from the amide nitrogen are ethyl sulfonate groups on about 0.1–2 percent of the amide nitrogens.

* * * * *